July 1, 1952 — M. CALVIN ET AL — 2,602,047
METHOD OF CONCENTRATING ISOTOPIC CARBON
Filed Dec. 21, 1949
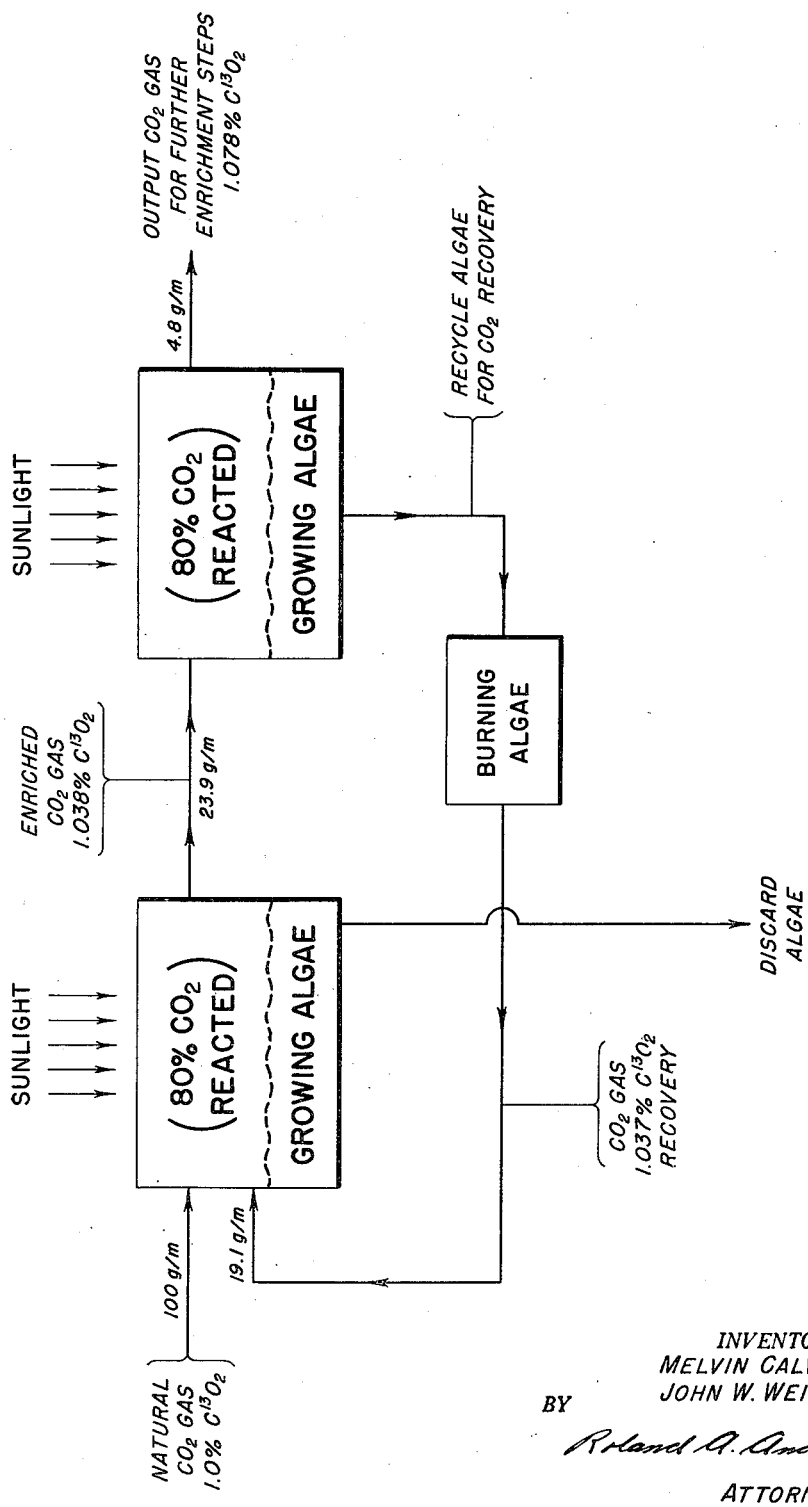
INVENTORS.
MELVIN CALVIN
JOHN W. WEIGL
BY
Roland A. Anderson
ATTORNEY.

Patented July 1, 1952

2,602,047

UNITED STATES PATENT OFFICE 2,602,047

METHOD OF CONCENTRATING ISOTOPIC CARBON

Melvin Calvin and John W. Weigl, Berkeley, Calif., assignors to the United States of America as represented by the United States Atomic Energy Commission Application December 21, 1949, Serial No. 134,270

11 Claims. (Cl. 204—157)

This invention relates to a new chemical method for the concentration of the isotopes of carbon and more particularly it relates to a method of separating the light and heavy isotopes of carbon contained in a mixture thereof by the preferential absorption of the lighter isotopes by living chlorophyllic organisms.

Recently there has developed a great need for large amounts of concentrated isotopes of various chemical elements including carbon. These isotopes are of enormous value to research workers in the fields of tracer chemistry and medicine. It is to be noted that the concentrated isotopes of carbon are of great utility, particularly in the fields of organic chemistry and the biological sciences. Reactions may be studied in greater detail and structures which were heretofore uncertain may now be positively established by means of these isotopes. For these reasons it is to be expected that large quantities of the isotopes of carbon will be in demand to satisfy the needs in these fields.

In the past, various methods for the concentration of isotopes have been devised and used. Perhaps the first of these was the mass-spectrographic method which separated only minute quantities of isotopes. Other methods for effecting the enrichment of an isotope followed and include separation by various diffusion means such as porous wall diffusion, gravitational diffusion, and thermal diffusion. Other methods of enrichment include electro-chemical means, fractional distillation, and chemical exchange reactions. All these methods are valuable for the concentration of particular isotopes and find applications in isotopic production at the present time. However, many are too costly in operation for the concentration of carbon isotopes or are not feasible for other reasons.

Now it has been found that the heavier isotopes of carbon may be separated from the lighter isotopes present in a mixture by feeding carbon dioxide formed from the mixed isotopes to chlorophyllic organisms whereupon the carbon dioxide containing the lighter isotopes is preferentially absorbed and utilized by the organisms. The principal reaction involved in the process appears to be a photosynthesis reaction in which the simple carbon dioxide is converted into complex molecules incorporated in the living tissue of the organism. In this manner it is possible to separate the heavier carbon isotopes 13 and 14 from the lighter carbon isotope 12 contained in a mixture. (Hereinafter said isotopes will be abbreviated as $C^{12}$, $C^{13}$ and $C^{14}$.)

It is therefore an object of the present invention to provide a useful, practical photosynthesis method for the concentration of $C^{13}$ and other heavier isotopes of carbon.

It is a further object of the present invention to provide a method for the concentration of the $C^{13}$ by a process using photosynthesis reactions.

It is a further object of the present invention to provide a photosynthesis method for the concentration of the heavy isotopes of carbon which is readily adaptable to commercial production of said isotopes.

It is a further object of the present invention to provide a method for the enrichment of $C^{13}$ in mixtures of gases using low cost materials in easily operated processes and equipment.

Other objects and advantages will be apparent from the following description taken in conjunction with the accompanying drawing of a flow diagram illustrating the invention.

The basic photosynthesis reactions which occur in green plants are not fully understood. However, it is known that plants which contain chlorophyll are able to utilize carbon dioxide to form complex organic molecules when they are exposed to sunlight. Accordingly, present theories indicate that light furnishes the energy required for the reduction of the carbon dioxide in such reactions. Many theories have suggested mechanisms for the photosynthesis reduction of carbon dioxide by chlorophyllic organisms but the present invention is not to be bound by the validity of any such explanations but only by the fact that the concentration of isotopes takes place as herein described. If normal carbon dioxide which contains about 1% of $C^{13}$ is reacted under controlled conditions with plant life, the $C^{12}$ is preferentially removed from the carbon dioxide feedstock. Therefore, the residual carbon dioxide is proportionately richer in $C^{13}$.

It will be appreciated, of course, that the heavier isotopes also are anabolized and, therefore, that organisms nourished on carbon dioxide which has been enriched in the heavier isotopes will themselves be proportionately richer in the heavier isotopes than the original carbon dioxide feedstock and it might be said that such organisms were enriched with respect to said isotope. The organisms nourished with the original feedstock carbon dioxide will become relatively depleted with respect to heavier isotope content and, therefore, should be discarded from the system. In the event that the organisms at any stage of the process become enriched with the desired isotope, carbon dioxide formed by burning said organisms is returned to the system. It appears that the preferential rate of absorption of the lighter isotopic carbon dioxide slows up as the heavier isotope concentration increases and that a steady state is finally achieved, which state may be regarded as a complex equilibrium state between the quantities of the heavier isotopes in the residual carbon dioxide and the heavier carbon isotopes present in the compounds forming the tissues of the organism. It follows that the enrichment of the residual carbon dioxide may be speeded and carried to greater proportions by employing both carbon dioxide and organisms which have been enriched with the desired isotope.

Moreover, by repeating the operation by employing appropriate batchwise cyclic or countercurrent cyclic processes with the reintroduction of enriched material into the sequence of operations, any desired degree of enrichment can be effected. If the feedstock mixture employed in the process contains the radioactive isotope $C^{14}$ it is likewise concentrated.

It has been found that, by employing organisms which are able to derive all of the carbon required in their metabolic processes from carbon dioxide, the full benefits and advantages of the process may be obtained. The algae have been quite suitable for the purposes of the invention. Other growing organisms, i. e., organisms capable of undergoing photosynthesis, may also be used with appropriate modification of the process.

In general, the process may be operated as a batch process by employing a closed system which is adapted to the growing of the organism employed. Appropriate apparatus may be equipped for temperature control, for agitating and illuminating the mixture, for introducing the carbon dioxide feedstock and for collecting and removing the reacted carbon dioxide. An appropriate nutrient medium, such as Hoagland's solution, may also be supplied in any appropriate fashion. When the process is operated in a continuous multistage fashion, provision must be made for burning of the organisms in which the proportion of the carbon isotope has been increased and for the reintroduction of the isotopically enriched carbon dioxide formed thereby.

Particular details of the process will become more apparent from a consideration of the following examples illustrating the operation of typical processes in accordance with the present invention. The specific values indicated in said examples are for illustrative purposes only and are not to be construed as limitative of the invention.

*Example A*

The first stage of the process, as illustrated in the drawing, can be operated in a single stage batchwise fashion for enriching normal carbon dioxide with respect to $C^{13}$ as follows: 75 kilograms of algae (*Chlorella pyrenoidosa* or *scenedesmus*) which have been centrifuged to remove excess water are introduced into the closed system together with an appropriate quantity of a nutrient solution, preferably with low intensity illumination. The operation of the process is begun by illuminating the algae with visible light from a suitable source and by introducing carbon dioxide. Sunlight has been found entirely suitable for illuminating the algae while artificial light may also be employed. The carbon dioxide is preferably introduced in admixture with a diluent gas, such as ordinary air or nitrogen, in a concentration not exceeding about 10 percent or not exceeding the limit which is normally tolerated by the organisms. The carbon dioxide is introduced at such a rate and in such a fashion that a predetermined proportion of the carbon dioxide is absorbed by the algae. Under the described conditions about 100 grams per minute of carbon dioxide which normally contains about 1% of $C^{13}O_2$ is introduced. The reaction is allowed to proceed at such a rate that about 80% of the incoming carbon dioxide reacts. Under these conditions the effluent 20% of the carbon dioxide is found to contain about 1.038% $C^{13}O_2$. Since the algae become relatively impoverished with respect to $C^{13}$ and therefore the efficiency of the process tends to drop after an extended period of operation, the algae are removed and discarded and new algae are introduced. The relative quantities of carbon dioxide present in the various gaseous mixtures may be continuously indicated by means of infrared adsorption cell equipment and the isotopic composition of the various admixtures of carbon dioxide are determined by mass spectrographic analysis.

*Example B*

The operation of the complete process, as illustrated in the drawing, will be described for effecting an enrichment of normal carbon dioxide with respect to $C^{13}$. Each of the stages of the two stage process illustrated in the drawing operates in a fashion very similar to the batchwise operation of the first stage, as described in Example A. However, in the present case appropriate modification is made for the burning of algae derived from the second stage and introduction of the carbon dioxide so derived into the first stage. Accordingly, a recycling effect is obtained and the process is operated in a continuous counter-current fashion. It will be appreciated that the second stage is of a proportionately smaller capacity since the quantity of carbon dioxide which must be treated is less than that of the first stage.

With the apparatus arranged to provide for continuous counter-current operation, as shown in the drawing, the following sequence of events occurs: With about 75 kilograms of centrifuged algae (*Chlorella pyrenoidosa* or *scenedesmus*) present in the first stage of the system and about 15 kilograms of algae in the second stage of the system, normal carbon dioxide is introduced in the first stage of the system, as described in Example A, and the effluent residual 20% of the carbon dioxide is introduced into the second stage. As a steady state is approached in each stage, algae are withdrawn from the second stage and burned to form carbon dioxide at the rate of about 19.1 g./m., which carbon dioxide is fed into the first stage. The effluent carbon dioxide from the first stage comprises carbon dioxide which has been singly enriched with respect to $C^{13}$ and the effluent carbon dioxide from the second stage comprises carbon dioxide which has been doubly enriched with respect to $C^{13}$. Under the steady state conditions described, it is found that the singly enriched carbon dioxide contains about 1.038% of $C^{13}O_2$ and the doubly enriched carbon dioxide contains about 1.078% $C^{13}O_2$ as compared to the original carbon dioxide which contains about 1% of $C^{13}O_2$. On the basis of a 100 g./m. input of normal carbon dioxide to the first stage and with recycling, about 23.9 g./m. of singly enriched carbon dioxide and 4.8 g./m.

of doubly enriched carbon dioxide are produced in the respective stages. For a two stage process without recycling, it has been found that only about 4.0 g./m. of a similar product is obtained. In the process employing recycling, the basis for the calculation of the 80% carbon dioxide utilization, of course, takes into consideration the quantity of carbon dioxide being recycled.

The foregoing examples illustrate typical processes operated in accordance with the invention. It will be apparent that the process resembles a multiple plate distillation process in which each stage is similar in operation to the "plates" of the distillation system. In the present case each stage (plate) achieves an increase of 4% over the original quantity of $C^{13}$ present. By supplying an appropriate number of stages any degree of enrichment can be effected. While the invention has been described with respect to an enrichment with respect to $C^{13}$, it is applicable to the separation of any of the heavier carbon isotopes from the lighter isotopes present in a mixture. Thus, $C^{14}$ present in a mixture may also be recovered, in which case, the quantity of $C^{14}$ present is easily determined by means of a thin mica window Geiger-Müller tube radioactivity counter.

Other organisms besides those indicated may be employed in the process, the requirements for such organisms are believed apparent from the foregoing description. Under some conditions of operation, barley seedlings have proven satisfactory. The temperature conditions under which the various organisms thrive vary somewhat but, in general, a temperature of between about 15° and 35° C. is satisfactory. The concentration of $CO_2$ maintained over the algae in each stage should be between about ½ and 10% by volume of the gas which in contact with the algae mixture and with the remainder consisting of a gas which is inert with respect to the photosynthesis reaction.

The carbon dioxide which has been sufficiently enriched with the desired isotope can be converted into barium carbonate by absorption in a barium salt solution to provide an easily handled article of manufacture.

As employed in the present application, the term "chlorophyllic" is intended to indicate that the organism is capable of utilizing carbon dioxide in a photosynthesis reaction.

While the salient features of this invention have been described in detail with respect to two embodiments, it will be apparent that numerous modifications may be made within the spirit and scope of the invention, and it is intended to cover all such that fall within the scope of the appended claims.

What we claim is:

1. In a method of concentrating an isotope of carbon including the enrichment of carbon dioxide with respect to a heavy isotope thereof, the steps comprising continuously contacting a gaseous mixture containing an inert gas and 0.5 to 10 volume percent of carbon dioxide which contains a mixture of heavy and light carbon isotopes with chlorophyllic plant life in a first closed system to preferentially remove carbon dioxide containing the lighter isotopes to yield carbon dioxide singly enriched with respect to the heavier isotopes, continuously removing said enriched carbon dioxide from the system, continuously contacting said singly enriched carbon dioxide with chlorophyllic plant life in a second closed system to yield carbon dioxide doubly enriched with respect to said heavy isotope, continuously removing said doubly enriched carbon dioxide from the system, removing quantities of plant life from said second system, burning said removed plant life to form carbon dioxide, and introducing said formed carbon dioxide into said first system.

2. In a photosynthesis method for concentrating an isotope of carbon including the enrichment of carbon dioxide with respect to a heavy isotope thereof, the steps comprising contacting chlorophyllic plant life in a first closed system with normal carbon dioxide contained to the extent of about 0.5 to 10 volume percent in admixture with an inert gas whereby the $C^{12}O_2$ is preferentially removed by the plant life and carbon dioxide enriched with $C^{13}O_2$ is produced therein, separating the enriched carbon dioxide from the system, contacting said enriched carbon dioxide contained to the extent of about 0.5 to 10 volume percent in admixture with an inert gas with chlorophyllic plant life in a second closed system whereby the carbon dioxide is doubly enriched with respect to $C^{13}O_2$, and recovering said doubly enriched carbon dioxide from the system.

3. A method for concentrating $C^{13}$ in normal carbon dioxide comprising contacting said carbon dioxide present to the extent of about 0.5 to 10 volume percent in admixture with an inert gas with plant life in a closed system whereby said plant life preferentially absorbs $C^{12}O_2$ from the carbon dioxide in said mixture to produce carbon dioxide singly enriched with $C^{13}O_2$, separating said enriched carbon dioxide from the system, similarly contacting said enriched carbon dioxide with a second mass of plant life whereby the growing plant mass preferentially absorbs $C^{12}O_2$ from the carbon dioxide producing carbon dioxide doubly enriched with $C^{13}O_2$, separating the doubly enriched carbon dioxide from the system, and burning quantities of the second mass of plant life to produce carbon dioxide, recycling said produced carbon dioxide including the repitition of said steps to achieve further enrichment.

4. A photosynthesis method for concentrating heavy isotopes of carbon contained in normal carbon dioxide comprising contacting said carbon dioxide while present to the extent of 0.5 to 10 volume percent in admixture with an inert gas with green plant life in a closed system to preferentially absorb $C^{12}O_2$ contained in said carbon dioxide and produce carbon dioxide enriched with $C^{13}O_2$, and separating said enriched carbon dioxide from the system.

5. A process of enriching carbon dioxide with respect to the heavy isotopes of carbon contained therein comprising contacting said carbon dioxide while present to the extent of 0.5 to 10 volume percent in admixture with an inert gas with a first mass of chlorophyllic organisms in a closed system to preferentially absorb lighter isotopic carbon dioxide in a photosynthesis reaction resulting in an enrichment of the residual carbon dioxide with respect to the heavier isotopes of carbon, separating said enriched residual carbon dioxide from said organisms, repeating said steps of contacting and separating said carbon dioxide as a multiple sequence of stages including said operations of contacting and separating employing multiple masses of organisms, producing carbon dioxide from quantities of said masses of organisms, introducing said produced carbon dioxide into earlier stages in said sequence, and recovering carbon dioxide enriched with respect to said heavy isotopes from said sequence of stages.

6. The process as in claim 5, wherein said organisms comprise algae.

7. The process as in claim 5, wherein quantities of the organisms derived from said first stage also are burned and the carbon dioxide so produced is introduced into said first stage.

8. The process of enriching carbon dioxide with respect to the heavy isotopes of carbon contained therein comprising contacting said carbon dioxide while present to the extent of 0.5 to 10 volume percent in admixture with an inert gas with chlorophyllic plant life in a closed system.

9. In a method for concentrating $C^{13}O_2$ contained in normal carbon dioxide, the step comprising contacting said carbon dioxide while present to the extent of 0.5 to 10 volume percent in admixture with an inert gas with algae in a closed system until the volume thereof has been reduced to less than about 20% of the original volume, and then separating said carbon dioxide from the system.

10. In a method of concentrating an isotope of carbon including the enrichment of carbon dioxide with respect to the heavy isotopes thereof, the steps comprising continuously contacting a gaseous mixture containing an inert gas and 0.5 to 10 volume percent of carbon dioxide which contains a mixture of heavy and light carbon isotopes with algae in a first closed system until about 80% of the original volume thereof is absorbed and the residual carbon dioxide is singly enriched with respect to the heavier isotopes, continuously removing said enriched carbon dioxide from said system, continuously contacting said enriched carbon dioxide with algae in a second closed system until about 80% of the original volume thereof is absorbed and the residual carbon dioxide is doubly enriched with the heavier isotopes, removing said doubly enriched carbon dioxide from the system, continuously removing quantities of algae from said second system, burning said removed algae to form carbon dioxide, and introducing said formed carbon dioxide into said first system.

11. A method for concentrating heavy isotopes of carbon from carbon dioxide containing a mixture of heavy and light isotopes thereof comprising contacting said carbon dioxide while present to the extent of about 0.5 to 10 volume percent in admixture with an inert gas with chlorophyllic plant life in a closed system whereby said plant life preferentially absorbs the lighter isotopic carbon leaving carbon dioxide singly enriched with the heavier isotopes, separating said enriched carbon dioxide from the plant life, similarly contacting said enriched carbon dioxide in admixture with an inert gas with a second mass of plant life whereby the carbon dioxide is doubly enriched with respect to said heavier carbon isotopes, separating said second mass of plant life and doubly enriched carbon dioxide, burning quantities of the second mass of plant life forming carbon dioxide which is enriched in said heavier isotopes with respect to the original carbon dioxide, and recycling the carbon dioxide formed thusly including a similar repetition of the foregoing steps, thereby effecting a further enrichment of said enriched carbon dioxide with respect to said heavier carbon isotopes.

MELVIN CALVIN.
JOHN W. WEIGL.

REFERENCES CITED

The following references are of record in the file of this patent:

Rabinowitch, "Photosynthesis," vol. 1, (1945), pp. 202–5, 241–4.

Pollard et al., "Applied Nuclear Physics," 2nd ed., (1951), p. 214.